UNITED STATES PATENT OFFICE.

GEORGE STEELE DUNCAN AND GEORGE HENRY POTTS, OF EDINBURGH, SCOTLAND, ASSIGNORS TO AMERICAN OFFSET COMPANY, OF NEW YORK, N. Y., A CORPORATION OF NEW YORK.

COMPOSITION FOR PREVENTING SET-OFFS IN PRINTING.

No. 823,675.　　　Specification of Letters Patent.　　　Patented June 19, 1906.

Application filed August 7, 1905. Serial No. 273,139.

*To all whom it may concern:*

Be it known that we, GEORGE STEELE DUNCAN and GEORGE HENRY POTTS, subjects of the King of the United Kingdom of Great Britain and Ireland, residing at Edinburgh, Scotland, have invented certain new and useful Improvements in Composition for Preventing Set-Offs in Printing, of which the following is a specification.

In the specification of application Serial No. 259,374 is described a liquid composition to be used for damping the set-off rollers in printing-machines to prevent set-off or transfer of ink from one sheet to another or from one side to the reverse side of a sheet in printing.

Our present invention has for its object the provision of a liquid composition which may be used in the same manner as the liquid composition the subject of the said application, but differing therefrom in its composition.

The liquid composition the subject of our present invention possesses especial advantages for use in single-side machines and perfecters which are not provided with rollers suitable to be damped with the liquid. In using the liquid the subject of our present invention in such single-side machines and perfecters the fixed set-off sheet is washed over with the liquid.

The constituents of the liquid composition the subject of our present invention are palm-oil, lard-oil, cotton-seed oil, and sperm or colza oils, methylated spirit, naphtha, and turpentine, the two last as ordinarily used by printers. The best proportions are as follows, the parts being by volume: palm-oil, three parts, (measured after just liquefying by heat;) lard-oil, two parts; cotton-seed oil, two parts; sperm or light colza, one and one-half parts; methylated spirits, two parts; naphtha, five parts; turpentine, one part. It is preferable to mix the oils together and after gently heating under stirring add to the liquid mixture when removed from the source of heat the other constituents, the whole being allowed to cool under stirring. Instead of naphtha benzin may be used; but naphtha is preferable.

Having now described our invention, what we claim, and desire to secure by Letters Patent of the United States, is—

A composition for preventing set-off comprising palm-oil, lard-oil, cotton-seed oil, sperm-oil, methylated spirits, naphtha and turpentine.

In testimony whereof we have signed our names to this specification in the presence of two subscribing witnesses.

GEORGE STEELE DUNCAN.
　　　GEORGE HENRY POTTS.

Witnesses:
　MARY MCCREDIE,
　WALLACE CRANSTON FAIRWEATHER.